(12) United States Patent
Brooks et al.

(10) Patent No.: US 7,985,398 B2
(45) Date of Patent: Jul. 26, 2011

(54) PREPARATION OF IRON OR IRON OXIDE NANOPARTICLES

(75) Inventors: Christopher J. Brooks, Dublin, OH (US); Jonathan Veinot, St. Albert (CA); Janet MacDonald, Edmonton (CA); Victoria Russell, Edmonton (CA)

(73) Assignees: Honda Motor Co., Ltd., Tokyo (JP); The Governors of the University of Alberta, Edmonton (CA)

( * ) Notice: Subject to any disclaimer, the term of this patent is extended or adjusted under 35 U.S.C. 154(b) by 637 days.

(21) Appl. No.: 11/637,055

(22) Filed: Dec. 12, 2006

(65) Prior Publication Data
US 2008/0138262 A1    Jun. 12, 2008

(51) Int. Cl.
*C01G 49/02* (2006.01)
(52) U.S. Cl. .................................. 423/633; 423/138
(58) Field of Classification Search .................. 423/138, 423/633
See application file for complete search history.

(56) References Cited

U.S. PATENT DOCUMENTS
5,698,483 A * 12/1997 Ong et al. .................... 501/12
7,410,625 B2 * 8/2008 Sun .............................. 423/138
2005/0039382 A1   2/2005 Blanchard et al.

FOREIGN PATENT DOCUMENTS
EP        0 628 612 A    12/1994
GB        1 249 558 A    10/1971

OTHER PUBLICATIONS

Shpaisman, N. and Margel, S., "Synthesis and Characterization of Air-Stable Iron Nanocrystalline Particles Based on a Single-Step Swelling Process of Uniform Polystyrene Template Microspheres", Chem. Mater., vol. 18, pp. 396-402 (2006), American Chemical Society.
Kanzaki, S.; Inada, T.; Matsumura, T.; Sonoyama, N.; Yamada, A.; Takano, M. and Kanno, R., Nano-sized γ-Fe2O3 as lithium battery cathode, J. Power Sources, vol. 146, pp. 323-326 (2005), Elsevier B.V.
Park, S.; Kim, S.; Lee, S.; Khim, Z.G.; Char, K. and Hyeon, T., "Synthesis and Magnetic Studies of Uniform Iron Nanorods and Nanospheres", J. Am. Chem. Soc., vol. 122, pp. 8581-8582 (2000), American Chemical Society.
Suslick, K.S.; Fang, M. and Hyeon, T., "Sonochemical Synthesis of Iron Colloids", J. Am. Chem . Soc., vol. 118, pp. 11960-11961 (1996), American Chemical Society.
Carpenter, E.E.; Calvin, S.; Stroud, R.M. and Harris, V.G., "Passivated Iron as Core-Shell Nanoparticles", Chem. Mater., vol. 15, pp. 3245-3246, (2003), American Chemical Society.
Burke, N.A.D; Stover, H.D.H. and Dawson, F.P., "Magnetic Nanocomposites: Preparation and Characterization of Polymer-Coated Iron Nanoparticles", Chem. Mater., vol. 14, pp. 4752-4761 (2000), American Chemical Society.
Ponder, S.M.; Darab, J.G.; Bucher, J.; Caulder, D.; Rao, L.; Shuh, D.K. and Mallouk, T.E., "Surface Chemistry and Electrochemistry of Supported Zerovalent Iron Nanoparticles in the Remediation of Aqueous Metal Contaminants", Chem. Mater., vol. 13, pp. 479-486 (2001), American Chemical Society.
Lee, J.; Im, S.; Lee, C.; Yu, J.; Choa, Y. and Oh, S., "Hollow nanoparticles of β-iron oxide synthesized by chemical vapor condensation", J. Nanoparticle Research, vol. 6, pp. 627-631 (2004), Springer.
Ngo, A.T.; Richardi, J. and Pileni, M.P., "Mesoscopic Solid Structures of 11-nm Maghemite, γ-Fe2O3, Nanocrystals: Experiment and Theory", Langmuir, vol. 21, pp. 10234-10239 (2005), American Chemical Society.
Huber, D.L., "Synthesis, Properties, and Applications of Iron Nanoparticles", small, vol. 1, No. 5, pp. 482-501 (2005), Wiley-VCH Verlag GmbH & Co.
S. Sun and H. Zeng, "Size-Controlled Synthesis of Magnetite Nanoparticles," J.Am.Chem.Soc. Communications, vol. 124, 2002, pp. 8204-8205.
J. Hong et al. "Surface Modification of Hydrophobic Iron Oxide Nanoparticles for Clinical Application," IEEE Transactions on Magnetics, vol. 41, No. 10, Oct. 1, 2005, pp. 4137-4139.
K. Woo et al., "Easy Synthesis and Magnetic Properties of Iron Oxide Nanoparticles," Chem. Mater, vol. 16,2004, pp. 2814-2818.
D. Huber et al., "Synthesis of highly magnetic iron nanoparticles suitable for field structuring using a β-diketone surfactant," Journal of Magnetism and Magnetic Materials, vol. 278, 2004, pp. 311-316.
T. Hyeon et al., "Synthesis of Highly Crystalline and Monodisperse Maghemite Nanocrystallites without a Size-Selection Process," J. Am. Chem. Soc., vol. 123, 2001, pp. 12798-12801.
D. Huber, "Synthesis, Properties, and Applications of Iron Nanoparticles," Small-Nano-Micro, Wiley VCH, Weinheim, DE, vol. 1, No. 5, May 1, 2005, pp. 482-501.
M. Hamoudeh et al., "Elaboration of PLLA-based superparamagnetic nanoparticles: Characterization, magnetic behaviour study and in vitro relaxivity evaluation," International Journal of Pharmaceutics, Amsterdam, vol. 338, No. 1-2, May 23, 2007, pp. 248-257.
International Search Report for PCT/US2007/087045 mailed Jun. 12, 2008.

* cited by examiner

*Primary Examiner* — Edward M Johnson
(74) *Attorney, Agent, or Firm* — Capital City TechLaw, PLLC; Mark E. Duell

(57) ABSTRACT

The present teachings are directed towards a thermolysis method of producing iron-containing nanoparticles by providing an iron-containing component, a colloid stabilizing component, and an amount of water. The iron-containing component, the colloid stabilizing component, and the amount of water form a mixture, which is then heated to a temperature sufficient to form iron-containing nanoparticles, which are then isolated from the mixture. Another method is also provided which involves a repetitive shell growth method of producing iron-containing nanoparticles by providing a first amount of an iron-containing component and a colloid stabilizing component; the iron-containing component and the colloid stabilizing component are then mixed and heated to a temperature sufficient to form iron-containing nanoparticles. The mixture is allowed to cool to room temperature, and an additional amount of iron-containing component is added to the mixture, which is then reheated to reaction temperature, and the process is repeated until the isolated iron-containing nanoparticles obtain the desired size.

35 Claims, 3 Drawing Sheets

US 7,985,398 B2

PREPARATION OF IRON OR IRON OXIDE NANOPARTICLES

BACKGROUND

1. Field of the Invention

This invention relates to methods for the preparation of iron- or iron oxide-containing nanoparticles.

2. Discussion of the Related Art

Particles with average sizes of less than about 200 nanometers, that is, nanoparticles, are of interest because their crystalline properties and other nanoscale features can dramatically change the properties of the material. The resulting unique mechanical, magnetic and electrical properties of nano-sized materials cause them to be of great interest.

It is well known in the art to prepare nanoparticles of various compositions by, for instance, mechanical alloying, mechanical grinding and ball milling of large particles until the desired crystal domain size is obtained. These grinding processes are time consuming, energy intensive, and produce a powder with a broad distribution of crystal domain sizes, including particles of undesirable larger sizes which need to be separated from the nanoparticles. This powder can also contain crystal domains encapsulated by larger particles of unwanted material. Additionally, the grinding materials utilized in the processes can contaminate the nanoparticle product.

Various methods of preparing iron nanoparticles and analysis of the properties of iron nanoparticles are presented in the review article by D. Huber published at small 2005, 1, No. 5, pp. 482-501 (Wiley-VCH Verlag GmbH & Co. KGaA, D-69451 Weinheim) also available on-line at www.small-journal.com.

A need exists, therefore, for methods of preparing nanoparticles, particularly iron or iron oxide-containing nanoparticles, which provide for control over the size of the resulting nanoparticles.

SUMMARY

The present teachings meet the needs for methods of producing nanoparticles with control over the particle size of the resulting nanoparticles, particularly for nanoparticles composed of iron or iron oxide.

One method of producing iron- or iron oxide-containing nanoparticles provided by the present teachings involves the thermolysis of a mixture of an iron-containing component, a colloid stabilizing component, and an amount of water by heating the mixture to a temperature sufficient to form iron-containing nanoparticles. The iron-containing nanoparticles are then isolated from the mixture. The size of the resulting iron-containing nanoparticles can be controlled by the ratio of the amount of water to the amount of the iron-containing component.

Another method provided by the present teachings for producing iron- or iron oxide-containing nanoparticles includes a repetitive shell growth method of producing nanoparticle by initially providing a first amount of an iron-containing component, and a colloid stabilizing component to form a mixture. The mixture is then heated to a temperature sufficient to form iron-containing nanoparticles, allowed to cool to room temperature, and then an additional, or second, amount of iron-containing component is added to the mixture. These heating, cooling and adding steps are repeated until a predetermined value is achieved, and then the iron-containing nanoparticles are isolated from the mixture. With this method the size of the iron-containing nanoparticles is controlled by controlling the number of times the heating, cooling and adding steps are repeated.

BRIEF DESCRIPTION OF THE DRAWINGS

The accompanying drawings which are included to provide a further understanding of the present teachings and are incorporated in and constitute a part of this specification, illustrate various embodiments of the present teachings and together with the detailed description serve to explain the principles of the present teachings. In the drawings.

DETAILED DESCRIPTION

Figure 3:
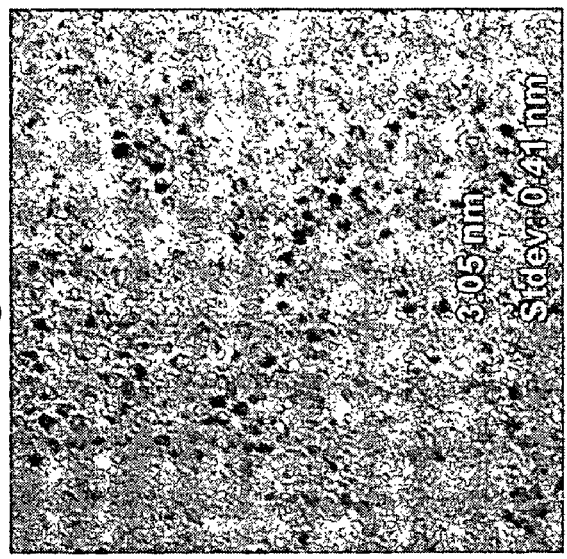
FIG. 3 is a TEM micrograph of iron-containing nanoparticles formed by a thermolysis method according to the present teachings.
Figure 2:
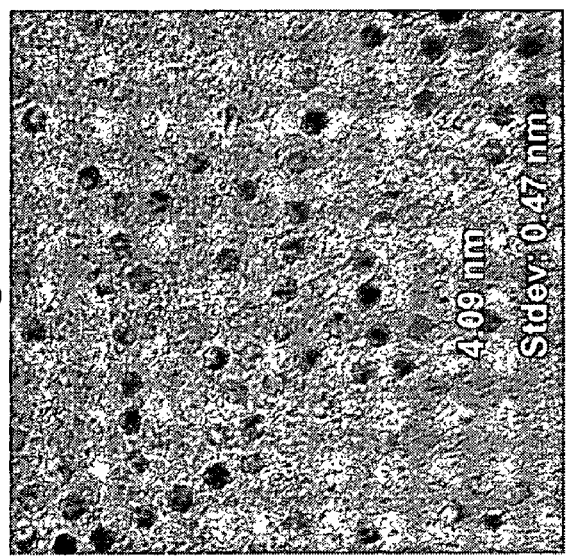
FIG. 2 is a TEM micrograph of iron-containing nanoparticles formed by a thermolysis method according to the present teachings.
Figure 1:
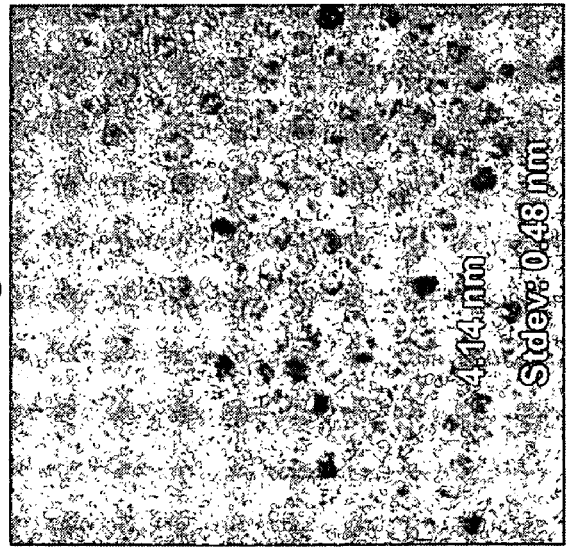
FIG. 1 is a TEM micrograph of iron-containing nanoparticles formed by a thermolysis method according to the present teachings.
Figure 4:
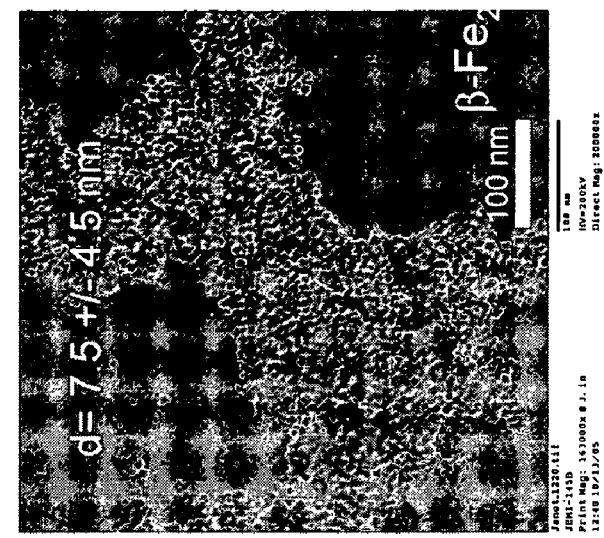
FIG. 4 is a TEM micrograph of iron-containing nanoparticles formed by a repetitive addition method according to the present teachings.
Figure 5:
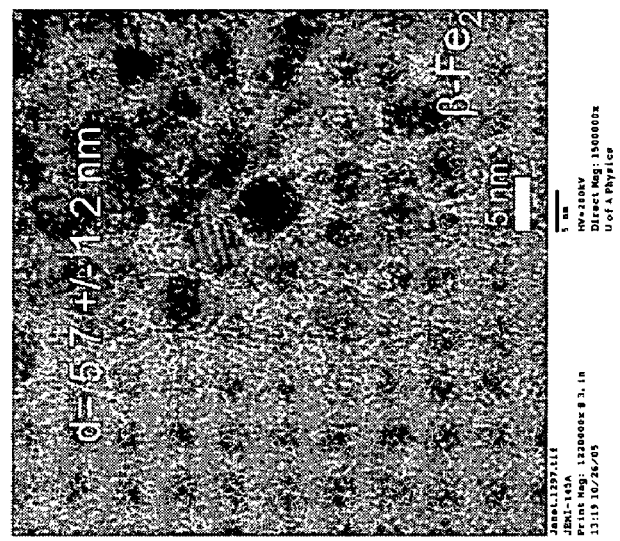
FIG. 5 is a TEM micrograph of iron-containing nanoparticles formed by a repetitive addition method according to the present teachings.
Figure 6:
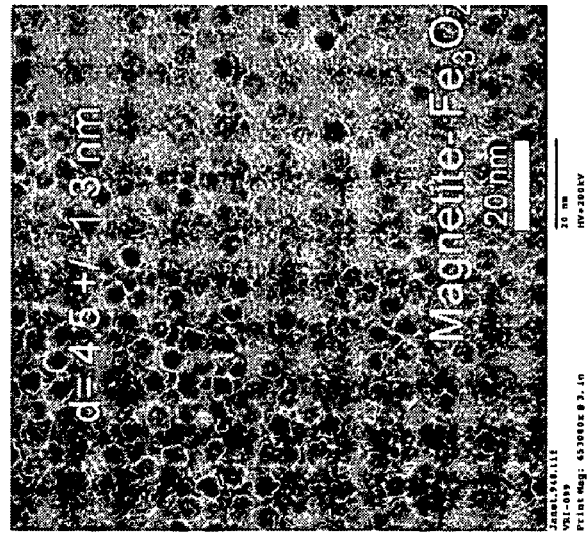
FIG. 6 is a TEM micrograph of iron-containing nanoparticles formed by a repetitive addition method according to the present teachings.
Figure 9:
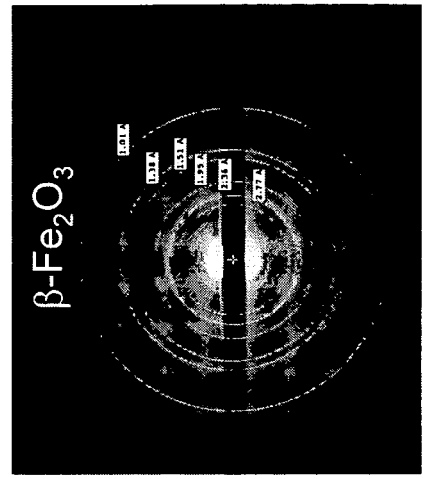
FIG. 9 is an electron microdiffraction spectrograph of iron-containing nanoparticles formed by the repetitive addition method according to the present teachings.
Figure 7:
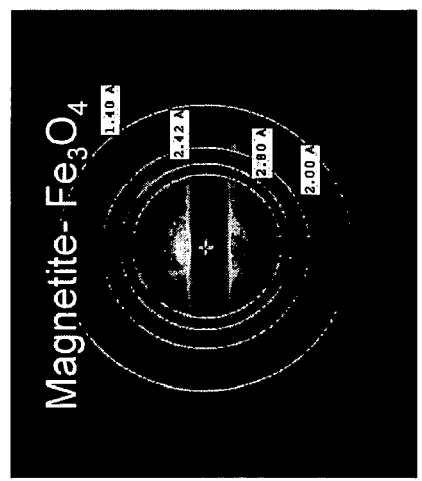
FIG. 7 is an electron microdiffraction5 spectrograph of iron-containing nanoparticles formed by the repetitive addition method according to the present teachings.
Figure 8:
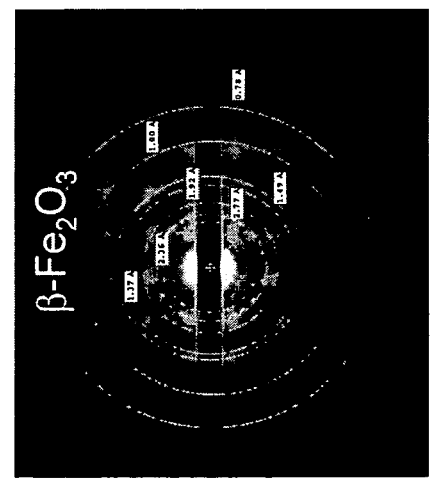
FIG. 8 is an electron microdiffraction spectrograph of iron-containing nanoparticles formed by the repetitive addition method according to the present teachings.

The present teachings are directed to methods of producing nanoparticles, particularly nanoparticles composed of iron, with particle size controlled during the production of the nanoparticles.

One method of producing iron-containing nanoparticles provided by the present teachings includes providing an iron-containing component, a colloid stabilizing component, and an amount of water. The three components are contacted together to form a first mixture, which is then heated to a temperature sufficient to form iron-containing nanoparticles, and the iron-containing nanoparticles are then isolated from the first mixture.

The method can further include providing a solvent component, and contacting the iron-containing component and the colloid stabilizing component in the presence of the solvent component. Suitable solvent components can include solvents with boiling point temperatures of at least about 250 C, or at least about 300 C at atmospheric pressure. Benzyl ether, octyl ether, diglyme and triglyme are some examples of suitable solvent components. One of skill in the art will recognize other possible solvent components.

The present method can utilize as the iron-containing component, an iron-containing compound with liable ligands, such as an iron-containing component with iron and carbonyl-containing compounds. Some possible examples of suitable iron-containing components include iron pentacarbonyl, disodiumtetracarbonylferrate, ferrocene and derivatives, diiron nonacarbonyl, triiron dodecacarbonyl and Prussian Blue. One of skill in the art will recognize other possible iron-containing precursors.

A colloid stabilizing component present in the present mixture can include at least one element from the group consisting of oleic acid, linoleic acid, carboxylic acids, unsaturated fatty acids, saturated fatty acids, long carbon chain quaternary amine salts, long carbon chain amines, long carbon chain thiols, long carbon chain alcohols, long carbon chain phosphines and long carbon chain phosphine oxides. As used herein, "long carbon chain" refers to carbon chains containing at least about six carbons, or at least about ten carbons, or at least about fourteen carbons. The ability of the colloid stabilizing component to provide a stable colloid can be utilized in the present method.

A temperature sufficient to form iron-containing nanoparticles as utilized in the present method can be a temperature between about 100 C and about 400 C, or a temperature between about 150 C and about 250 C. The temperature should be high enough to drive the formation of the iron-containing nanoparticles but should be lower than temperatures that would degrade or decompose either of the solvent component or the colloid stabilizing component.

Using the presently taught method, iron-containing nanoparticles having diameters of less than about 6 nanometers, less than about 4 nanometers, or less than about 2 nanometers can be achieved.

The size of the isolated iron-containing nanoparticles can be controlled by varying the amount of water provided relative to the amount of the iron-containing component present in the reaction mixture. With the present method, increasing the amount of water provided relative to the amount of the iron-containing component decreases the size of the isolated iron-containing nanoparticles. This control effect is observed in Examples 1-3 as set forth below in more detail.

Another method of producing iron-containing nanoparticles provided by the present disclosure includes a process of providing a first amount of an iron-containing component and a colloid stabilizing component, and contacting the iron-containing component and the colloid stabilizing component to form a mixture. The mixture is then heated to a temperature sufficient to form iron-containing nanoparticles, allowed to cool to room temperature, and another amount of iron-containing component is added to the mixture. These repetitive steps of heating, cooling and adding more iron-containing component can then be repeated until a predetermined value is achieved, and then the iron-containing nanoparticles can be isolated.

The present method can also include the additional steps of providing a solvent component, and contacting the iron-containing component with the colloid stabilizing component in the presence of the solvent component. Suitable solvent components can include solvents with boiling point temperatures of at least about 250 C, or at least about 300 C at atmospheric pressure. Benzyl ether, octyl ether, diglyme and triglyme are some examples of suitable solvent components.

The iron-containing component utilized in the presently disclosed method can include an iron-containing compound with liable ligands. The iron-ligand stability should be such that the ligand will react or can be removed at temperatures of about 200 C to allow formation of the iron-containing nanoparticles. Examples of iron-containing components are compounds composed of iron and carbonyl-containing compounds, with one specific example suitable for the present method comprising iron pentacarbonyl. Disodiumtetracarbonylferrate, ferrocene and derivatives, diiron nonacarbonyl, triiron dodecacarbonyl and Prussian Blue are among other possible iron-containing components.

The method according to the present teachings also includes a colloid stabilizing component such as at least one element selected from the group consisting of oleic acid, linoleic acid, carboxylic acids, unsaturated fatty acids, saturated fatty acids, long carbon chain quaternary amine salts, long carbon chain amines, long carbon chain thiols, long carbon chain alcohols, long carbon chain phosphines and long carbon chain phosphine oxides. The colloid stabilizing component suitable for the presently taught method can provide a colloid of iron-containing component sufficient to form the iron-containing nanoparticles upon heating to a sufficient temperature.

The heating process step of the presently disclosed method can be at a temperature between about 100 C and about 400 C, or at a temperature between about 150 C and about 250 C. The temperature should be less than the decomposition temperature of the solvent component, if present, or the colloid stabilizing component.

The repetition of the heating, cooling, and addition steps can be continued until a predetermined value is achieved. This predetermined value can include the iron-containing nanoparticles, or at least a majority of the iron-containing nanoparticles, reaching a desired size, or the iron-containing nanoparticles obtaining a desired crystal structure. As set forth below in Examples 4-6, the iron-containing nanoparticles obtained by the presently taught process can be, for example, in the magnetite $Fe_3O_4$ phase or in a beta-$Fe_2O_3$ phase.

Depending on various factors including the number of times the heating, cooling and addition steps are repeated, the isolated iron-containing nanoparticles produced by the presently disclosed method can have diameters of less than about 8 nanometers, less than about 6 nanometers, less than about 4 nanometers, or less than about 2 nanometers.

The presently disclosed method allows for the control of the size of the isolated iron-containing nanoparticles by controlling the number of repeats of the heating, cooling and addition steps of the above-described process.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Analysis Techniques

TEM was utilized to determine the particle size of the collected materials, and electron diffraction was utilized to determine the crystalline structure of the collected materials.

Examples 1-3

Benzyl ether (10 mL) and oleic acid (2 mL) were added to a reflux apparatus and bubbled with argon for 1 hour. Iron pentacarbonyl (0.3 mL), and water (varying amounts, respectively 0.25 μl (Example 1), 0.50 μl (Example 2), and 1.00 μl (Example 3)) were added and the solution brought to 200° C. for 10 hours. The solution became black during heating. The solution was added to a test-tube fitted with a septum and flushed with argon. The addition of dry methanol (15 mL) caused a black precipitate to settle out after centrifugation with a standard bench top centrifuge for three minutes. The supernatant was removed and the precipitate resuspended in dry diethyl ether (3 mL). Three consecutive suspensions and precipitations were conducted with methanol and diethyl ether. The resulting precipitate was dried under vacuum.

Using the above procedure, size control is achieved through tailoring the water concentration. Addition of non-stoichiometric amounts of water to the reaction mixture 0.25, 0.50, and 1.00 μl yielded particle sizes of 4.14±0.48 nm (Example 1), 4.09±0.47 nm (Example 2) and 3.05±0.41 nm (Example 3), respectively.

Examples 4-6

Benzyl ether (10 mL) and oleic acid (2 mL) were added to a reflux apparatus and bubbled with argon for 1 hour. Iron pentacarbonyl (0.3 mL) was added and the solution brought to 200° C. for 20 hours. The solution became black. The reaction mixture was allowed to cool to room temperature. A portion of the reaction mixture was removed and dry methanol was added and after centrifugation on a standard bench top centrifuge for three minutes a black precipitate settled out of solution. The supernatant was removed and the precipitate resuspended in dry diethyl ether (3 mL). Three consecutive suspensions and precipitations were conducted with methanol and diethyl ether. The resulting precipitate (Example 4) was dried under vacuum.

To the remainder of the reaction mixture, degassed benzyl ether (20 mL) and a second quantity of iron pentacarbonyl (0.3 mL) were added. The mixture was again heated at 200° C. for 20 hours. The reaction mixture was allowed to cool to room temperature, and a second portion of the reaction mixture was removed, and particles (Example 5) isolated as set forth above.

To the remainder of the reaction mixture, a third amount of iron pentacarbonyl (0.3 mL) was added. The mixture was heated at 200° C. for 20 hours. Particles (Example 6) were isolated as outlined above.

Using the procedure outlined above, size control is achieved. Particles obtained from the first, second and third subsequent additions of $Fe(CO)_5$ outlined above had particle diameters of 4.5±1.3 nm, 5.7±1.2 nm and 7.5±4.5 nm, respectively.

Additionally, a change in particle crystal structure was observed between the three samples. The particles obtained from the Examples 4-6 were oxidized in air at room temperature to form the iron oxide nanoparticles. The oxides show crystal structures of magnetite ($Fe_3O_4$), $\beta$-$Fe_2O_3$, and $\beta$-$Fe_2O_3$, respectively, for the three Examples. The crystal structures changed as the particle size increased.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of producing iron-containing nanoparticles comprising
    providing an iron-containing component;
    providing a colloid stabilizing component;
    providing an amount of water and varying the amount of water provided relative to the amount of the iron-containing component to adjust the size of the later isolated iron-containing nanoparticles;
    contacting the iron-containing component and the colloid stabilizing component in the presence of the amount of water to form a first mixture;
    heating the first mixture to a temperature sufficient to form iron-containing nanoparticles; and
    isolating the iron-containing nanoparticles from the first mixture, and
    wherein increasing the amount of water provided relative to the amount of the iron-containing component decreases the size of the isolated iron-containing nanoparticles.

2. The method according to claim 1, further comprising
    providing a solvent component, and
    contacting the iron-containing component and the colloid stabilizing component in the presence of the solvent component.

3. The method according to claim 2, wherein the solvent component comprises at least one member selected from the group consisting of benzyl ether, octyl ether, diglyme and triglyme.

4. The method according to claim 1, wherein the iron-containing component comprises an iron-containing compound with liable ligands.

5. The method according to claim 1, wherein the iron-containing component comprises iron and carbonyl-containing compounds.

6. The method according to claim 1, wherein the iron-containing component comprises at least one element selected from the group consisting of iron pentacarbonyl, disodiumtetracarbonylferrate, ferrocene and derivatives, diiron nonacarbonyl, triiron dodecacarbonyl and Prussian Blue.

7. The method according to claim 1, wherein the colloid stabilizing component comprises at least one member selected from the group consisting of oleic acid, linoleic acid, carboxylic acids, unsaturated fatty acids, saturated fatty acids, long carbon chain quaternary amine salts, long carbon chain amines, long carbon chain thiols, long carbon chain alcohols, long carbon chain phosphines and long carbon chain phosphine oxides.

8. The method according to claim 1, wherein a temperature sufficient to form iron-containing nanoparticles comprises a temperature between about 100 C and about 400 C.

9. The method according to claim 8, wherein a temperature sufficient to form iron-containing nanoparticles comprises a temperature between about 150 C and about 250 C.

10. The method according to claim 1, wherein the iron-containing nanoparticles comprise iron-containing nanoparticles with diameters of less than about 6 nanometers.

11. The method according to claim 1, wherein the iron-containing nanoparticles comprise iron-containing nanoparticles with diameters of less than about 4 nanometers.

12. The method according to claim 1, wherein the iron-containing nanoparticles comprise iron-containing nanoparticles with diameters of less than about 2 nanometers.

13. A method of producing iron-containing nanoparticles comprising
   a) providing a first amount of an iron-containing component;
   b) providing a colloid stabilizing component;
   c) contacting the iron-containing component and the colloid stabilizing component to form a mixture;
   d) heating the mixture to a temperature sufficient to form iron-containing nanoparticles;
   e) allowing the mixture to cool to room temperature;
   f) adding an additional amount of iron-containing component to the mixture;
   g) repeating steps d), e) and f) until a predetermined value is achieved; and
   h) isolating iron-containing nanoparticles,
   wherein the predetermined value comprises the particle size or the crystal structure of the iron-containing nanoparticles.

14. The method according to claim 13, further comprising providing a solvent component, and
   contacting the iron-containing component and the colloid stabilizing component in the presence of the solvent component.

15. The method according to claim 14, wherein the solvent component comprises at least one member selected from the group consisting of benzyl ether, octyl ether, diglyme and triglyme.

16. The method according to claim 13, wherein the iron-containing component comprises an iron-containing compound with liable ligands.

17. The method according to claim 13, wherein the iron-containing component comprises iron and carbonyl-containing compounds.

18. The method according to claim 13, wherein the iron-containing component comprises at least one element selected from the group consisting of iron pentacarbonyl, disodiumtetracarbonylferrate, ferrocene and derivatives, diiron nonacarbonyl, triiron dodecacarbonyl and Prussian Blue.

19. The method according to claim 13, wherein the colloid stabilizing component comprises at least one member selected from the group consisting of oleic acid, linoleic acid, carboxylic acids, unsaturated fatty acids, saturated fatty acids, long carbon chain quaternary amine salts, long carbon chain amines, long carbon chain thiols, long carbon chain alcohols, long carbon chain phosphines and long carbon chain phosphine oxides.

20. The method according to claim 13, wherein a temperature sufficient to form iron-containing nanoparticles comprises a temperature between about 100 C and about 400 C.

21. The method according to claim 20, wherein a temperature sufficient to form iron-containing nanoparticles comprises a temperature between about 150 C and about 250 C.

22. The method according to claim 13, wherein the predetermined value comprises the iron-containing nanoparticles reaching a particle size ranging between about 2 nm and about 8 nm.

23. The method according to claim 13, wherein the predetermined value comprises the iron-containing nanoparticles having either a magnetite ($Fe_3O_4$) or $\beta$-$Fe_2O_3$ crystal structure.

24. The method according to claim 13, wherein the isolated iron-containing nanoparticles comprise iron-containing nanoparticles having a diameter of less than about 8 nanometers.

25. The method according to claim 13, wherein the isolated iron-containing nanoparticles comprise iron-containing nanoparticles having a diameter of less than about 6 nanometers.

26. The method according to claim 13, wherein the isolated iron-containing nanoparticles comprise iron-containing nanoparticles having a diameter of less than about 4 nanometers.

27. The method according to claim 13 further comprising controlling the size of the isolated iron-containing nanoparticles by controlling the number of repeats of steps d), e) and f).

28. A method of producing iron-containing nanoparticles comprising
   providing an iron-containing component;
   providing a colloid stabilizing component;
   providing a solvent component;
   providing an amount of water;
   contacting the iron-containing component and the colloid stabilizing component in the presence of the amount of water and solvent component to form a first mixture;
   varying the amount of water provided relative to the amount of the iron-containing component;
   heating the first mixture to a temperature sufficient to form iron-containing nanoparticles; and
   isolating the iron-containing nanoparticles from the first mixture,
   wherein the solvent component comprises at least one member selected from the group consisting of benzyl ether, octyl ether, diglyme and triglyme, and
   an increase in the amount of water provided relative to the amount of the iron-containing component decreases the size of the isolated iron-containing nanoparticles.

29. The method according to claim 28, wherein the iron-containing component comprises an iron-containing compound with liable ligands.

30. The method according to claim 28, wherein the iron-containing component comprises iron and carbonyl-containing compounds.

31. The method according to claim 28, wherein the iron-containing component comprises at least one element selected from the group consisting of iron pentacarbonyl, disodiumtetracarbonylferrate, ferrocene and derivatives, diiron nonacarbonyl, triiron dodecacarbonyl and Prussian Blue.

32. The method according to claim 28, wherein the colloid stabilizing component comprises at least one member selected from the group consisting of oleic acid, linoleic acid, carboxylic acids, unsaturated fatty acids, saturated fatty acids, long carbon chain quaternary amine salts, long carbon chain amines, long carbon chain thiols, long carbon chain alcohols, long carbon chain phosphines and long carbon chain phosphine oxides.

33. The method according to claim 28, wherein a temperature sufficient to form iron-containing nanoparticles comprises a temperature between about 100 C and about 400 C.

34. The method according to claim 33, wherein a temperature sufficient to form iron-containing nanoparticles comprises a temperature between about 150 C and about 250 C.

35. The method according to claim 28, wherein the iron-containing nanoparticles comprise iron-containing nanoparticles with diameters of less than about 2 nanometers.

* * * * *